United States Patent
Brecher et al.

(10) Patent No.: US 6,904,088 B1
(45) Date of Patent: Jun. 7, 2005

(54) EFFICIENT EQUALIZATION FOR DETECTION OF SYMBOLS IN DIGITAL BURST TRANSMISSIONS

(75) Inventors: Liran Brecher, Yafo (IL); Yigal Bitran, Tel Aviv (IL); Melamed Oded, Shoam (IL); Naftali Sommer, Rishon Lezion (IL)

(73) Assignee: Texas Instruments Incorporated, Dallas, TX (US)

( * ) Notice: Subject to any disclaimer, the term of this patent is extended or adjusted under 35 U.S.C. 154(b) by 775 days.

(21) Appl. No.: 09/711,025

(22) Filed: Nov. 9, 2000

(51) Int. Cl.[7] .............................. H03H 7/30; H03H 7/40; H03K 5/159
(52) U.S. Cl. ........................................ 375/233; 708/323
(58) Field of Search ................................ 375/229, 230, 375/231, 232, 233, 350; 708/300, 322, 323

(56) References Cited

U.S. PATENT DOCUMENTS

| 5,068,873 | A | * | 11/1991 | Murakami .................. 375/231 |
| 5,175,747 | A | * | 12/1992 | Murakami .................. 375/232 |
| 5,311,546 | A | * | 5/1994 | Paik et al. .................. 375/232 |
| 5,790,658 | A | * | 8/1998 | Yip et al. .............. 379/406.09 |
| 6,678,376 | B1 | * | 1/2004 | Takahashi et al. ...... 379/406.01 |

* cited by examiner

*Primary Examiner*—Jean B. Corrielus
(74) *Attorney, Agent, or Firm*—Abdul Zindani; W. James Brady, III; Frederick J. Telecky, Jr.

(57) ABSTRACT

The detection of symbols in digital burst transmissions is improved by an equalizer (30) that initializes the values of only a subset of its filter coefficients (C, D), and thereafter begins to decode the symbols using an iterative, decision directed algorithm that determines all of its filter coefficients. This can advantageously provide an acceptable trade-off between computational complexity and equalizer performance.

25 Claims, 2 Drawing Sheets

EFFICIENT EQUALIZATION FOR DETECTION OF SYMBOLS IN DIGITAL BURST TRANSMISSIONS

FIELD OF THE INVENTION

The invention relates generally to the detection of symbols in digital burst transmissions and, more particularly, to equalization of received bursts in order to reduce the mean squared error (MSE) of the detected symbols.

BACKGROUND OF THE INVENTION

FIG. 1 diagrammatically illustrates pertinent portions of an exemplary digital communication system according to the prior art. In the example of FIG. 1, a digital transmitter produces a sequence of iid (independent identical distributed) symbols designated as A[n]. This sequence of symbols is transmitted in a digital communication burst across an equivalent channel to an equalizer 11 provided in a digital receiver. As illustrated in FIG. 1, the equivalent channel between the transmitted symbols A[n] and the equalizer input includes portions of both the digital transmitter and the digital receiver, as well as a physical communication link or channel. For example, the equivalent channel would include modulation components of the transmitter, and demodulation components and notch filters of the receiver.

The equalizer 11 includes a feed forward equalizer (FFE) 13, which is a finite impulse response (FIR) filter that processes the received samples after some pre-processing in earlier stages of the receiver (included in the equivalent channel of FIG. 1). The sampling rate of the input to this feed forward equalizer module can be one sample per symbol or more. A sampling rate of one sample per symbol matches exactly the symbol rate (also known as the baud rate), and a feed forward equalizer having a one sample per symbol sampling rate is conventionally referred to as a T-spaced equalizer (TSE). A feed forward equalizer whose input sampling rate is higher than the symbol rate (for example twice the symbol rate) is conventionally referred to as a fractionally spaced equalizer (FSE). An upsampler 18 illustrates the possibility of multiplying the sampling rate by M at the transmitter, in which case a corresponding downsampler 14 divides the sampling rate by M at the receiver.

A slicer 15 is the decision element of the equalizer. The output of the feed forward equalizer module 13 is combined with information from a feedback loop 12 to produce the input for the slicer 15. The output Z[n] of the slicer 15 is indicative of which symbol (in the constellation) was transmitted. One typical conventional decision criteria that can be used by the slicer 15 is the Minimum Euclidean Distance (MED) criteria. The output of the slicer 15 is also provided as an input to the feedback loop 12.

The feedback loop 12 includes a feedback filter 17, for example a FIR filter that operates at the symbol rate. The input to this feedback filter 17 is the slicer output, namely the decision regarding what symbol was last transmitted. Assuming correct decisions from the slicer 15, the feedback filter 17 can compensate for the post cursor part of the interference from symbols that are previous in time. Such interference from timewise previous symbols is conventionally known as inter-symbol interference or ISI.

The FIR filter of the feed forward equalizer 13 is defined by a finite length sequence C[n] of filter coefficients (or filter taps), and the FIR filter of the feedback filter module 17 is defined by a finite length sequence D[n] of filter coefficients.

The length of C[n] is herein referred to as K, and the length of D[n] is herein referred to as L. The basic task of the equalizer is to find the coefficients of C[n] and D[n] that minimize the mean squared error (MSE) associated with the decided symbols in the slicer output Z[n]. A coefficient determiner 19 uses conventional techniques, for example, least mean squares (LMS), least squares (LS) or recursive least squares (RLS) to determine the coefficients of C[n] and D[n] that minimize the MSE of the slicer 15.

FIG. 2 diagrammatically illustrates a conventional model of the equivalent channel of FIG. 1. The equivalent channel is modeled as a digital filter 21 having a filter tap sequence H[n], and an additive noise factor. Assume for purposes of exemplary exposition that the additive noise in the equivalent channel model is stationary white noise w[n] that obeys the following statistics:

Equation 1:

$$E\{w[n]\}=0$$

Equation 2:

$$Rw[l] = E\{w[n] \cdot w[n-l]\} = \begin{cases} N0/2 & l = 0 \\ 0 & \text{otherwise} \end{cases}$$

where E is the expected value operator, N0/2 is the noise variance, R is the autocorrelation function, and l is the time index.

The source A[n] of FIG. 1 is also white (i.e., independent identical distributed) and obeys the following statistics:

Equation 3:

$$E\{A_n \cdot A_{n-m}\} = \begin{cases} \sigma_A^2 & m = 0 \\ 0 & \text{otherwise} \end{cases}$$

where $\rho_A^2$ is the signal variance.

Under the exemplary conditions described above, the MSE of the slicer output can be expressed as follows for the case of a T-spaced equalizer:

Equation 4:

$$MSE = E\{(Z[n] - A[n])^2\} =$$

$$\sigma_A^2 \cdot \sum_{m=-\infty}^{-1} \left( \sum_{k=-U}^{V} C[k] \cdot h[m-k] \right)^2 + \sigma_A^2 \left( \left( \sum_{k=-U}^{V} C[k] \cdot h[-k] \right) - 1 \right)^2 +$$

$$\sigma_A^2 \cdot \sum_{m=1}^{\infty} \left( \sum_{k=-U}^{V} C[k] \cdot h[m-k] + D[m] \right)^2 + \frac{N0}{2} \cdot \sum_{k=-U}^{V} C[k]^2$$

For the fractionally spaced equalizer, the MSE can be expressed as follows:

Equation 5:

$$MSE = E\{(Z[n] - A[n])^2\} =$$

$$\sigma_A^2 \cdot \sum_{m=-\infty}^{-1} \left( \sum_{k=-U}^{V} C[k] \cdot h[2m-k] \right)^2 + \sigma_A^2 \left( \left( \sum_{k=-U}^{V} C[k] \cdot h[-k] \right) - 1 \right)^2 +$$

-continued $$\sigma_A^2 \cdot \sum_{m=1}^{\infty} \left( \sum_{k=-U}^{V} C[k] \cdot h[2m-k] + D[m] \right)^2 + \frac{N0}{2} \cdot \sum_{k=-U}^{V} C[k]^2$$

For a T-spaced equalizer, Equation 4 is the cost function that is to be minimized with respect to C[n] and D[n]. In the case of a fractionally spaced equalizer, Equation 5 is to be minimized with respect to C[n] and D[n].

In Equations 4 and 5 and hereinafter, U is the number of uncausal coefficients in C[n], and V is the number of causal coefficients in C[n].

For purposes of exemplary exposition, the following conditions are assumed. Communications occur in bursts through the equivalent channel of FIG. 1, which equivalent channel can vary between two consecutive bursts. A single burst includes a preamble (a short, unique training sequence) and an unknown sequence of symbols (the substantive information), and the channel can be easily estimated from the preamble at the beginning of the burst. It is desirable to decode the burst with minimum latency, and the number of MMACs (Million Multiply and Accumulate per second) is of course limited. Under these conditions, the receiver has a limited time and a limited number of data processing operations to achieve a sufficiently low MSE.

Conventional techniques which can be implemented by the coefficient determiner of FIG. 1 to determine the C[n] and D[n] coefficients which will minimize the MSE include the least mean square (LMS) algorithm and its various versions. To use these decision directed algorithms, the MSE between the slicer input and the slicer output must be lower than a certain threshold (which threshold depends on the constellation being used) in order to permit the decoding of the unknown symbols to commence with an acceptably low symbol error rate. Most LMS algorithms therefore have the disadvantage of potentially requiring many iterations and many repetitions over the preamble to achieve the desired results.

The conventional LS or RLS algorithm can be used to determine the C[n] and D[n] coefficients, but this algorithm is more complex and therefore less practical than the LMS algorithm. If the channel is unknown, implementation of the LS/RLS approach involves matrix inversion of the size K+L, where K is the length of the sequence C[n] and L is the length of the sequence D[n]. If the channel is known, then a matrix inversion of size K is required. Although the LS/RLS, algorithm provides the optimal solution (based on the empirical statistics of the preamble) in terms of MSE, the aforementioned matrix inversions are quite expensive in terms of the required data processing power (e.g. multiply and accumulate operations).

It is desirable in view of the foregoing to provide for equalization that requires less computational complexity than the prior art, while still maintaining sufficient performance.

The present invention provides efficient equalization by initializing the values of only a subset of the feed forward and feedback coefficients. After these values are initialized, decoding of the unknown symbols is commenced using, for example, the LMS algorithm or another iterative, decision directed algorithm to determine all of the feed forward and feedback coefficients. The initialization of a subset of the coefficient values before decoding the unknown symbols can advantageously provide an acceptable trade-off between computational complexity and equalization performance.

DETAILED DESCRIPTION

Figure 1:
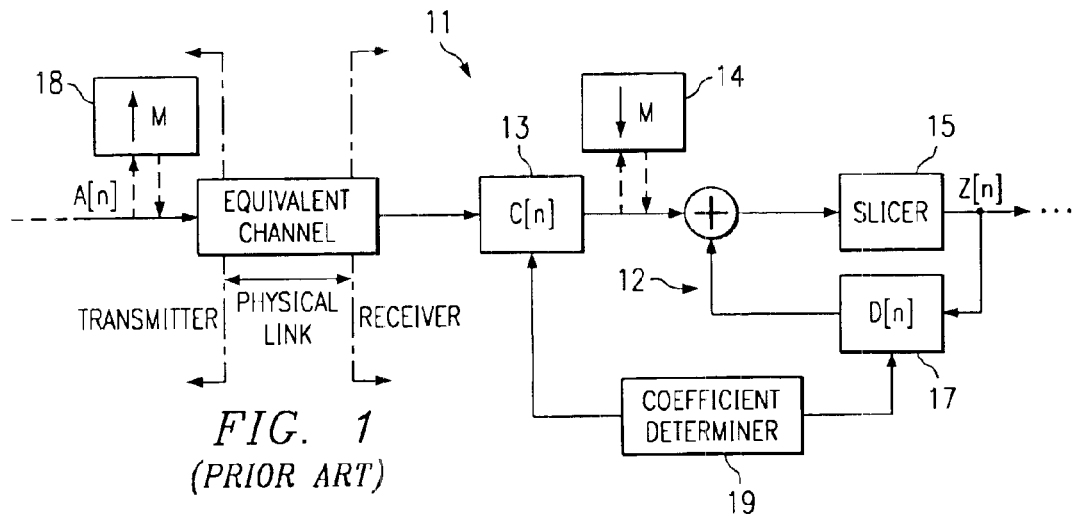
FIG. 1 diagrammatically illustrates pertinent portions of an exemplary digital communication system according to the prior art.
Figure 3:
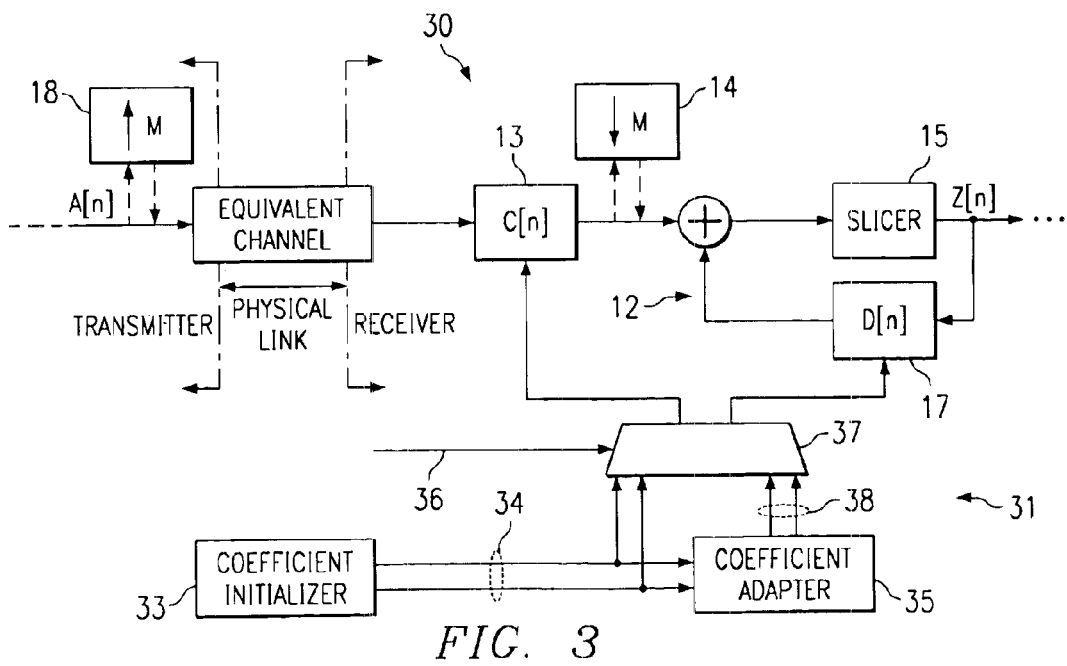
FIG. 3 diagrammatically illustrates pertinent portions of an exemplary embodiment of a digital communication system according to the present invention.

FIG. 3 illustrates pertinent portions of an exemplary embodiment of a digital communication system according to the present invention. In the embodiment of FIG. 3, the equalizer 30 includes a coefficient determiner 31 having a coefficient initializer 33 and a coefficient adaptor 35 and a selector 37 for selectively coupling the coefficient initializer and the coefficient adaptor to the feed forward equalizer 13 and the feedback filter 17. Other than the coefficient determiner 31, the components of the exemplary embodiment of FIG. 3 can be generally the same as the corresponding components illustrated in FIG. 1.

The coefficient initializer 33 determines initial coefficient values of a subset of the coefficients of C, and also determines initial coefficient values of the coefficients of D. These initial coefficient values are output at 34 by the coefficient initializer 33, and are then provided to the feed forward equalizer 13 and the feedback filter 17 via the selector 37. Thus, a subset (less than all) of the C and D coefficients is initially provided to the equalizer 30. A control signal 36 initially selects the coefficient initializer output 34 to be passed through the selector 37, thereby permitting the initial coefficient values to be applied to the filters 13 and 17. After the initialized subset of C and D coefficient values has been output at 34, the control signal at 36 causes the selector 37 to switch and select the output 38 of the coefficient adaptor 35. The control signal 36 can be, for example, a suitable output of a state machine (not explicitly shown), which output can become active when a predetermined amount of time (adequate for calculation of the initialized subset of C and D coefficient values) has elapsed since arrival of a communication burst at the receiver. After the control signal 36 becomes active to switch the selector 37, the coefficient adaptor 35 calculates all or some of the C and D coefficients using, for example, any desired conventional iterative, decision directed algorithm such as LMS. The subset of coefficients initially provided by the coefficient initializer 33 provides a MSE which is low enough to thereafter begin decoding the symbols according to the coefficients calculated by the coefficient calculator 35, while still maintaining an acceptable symbol error rate. Thus, the coefficient calculator 35 calculates all of the subsequent feed forward coefficients of C and the subsequent feedback coefficients of D in generally conventional fashion (analogously to the operation of the coefficient determiner 19 of FIG. 1). The initialized subset of coefficient values, i.e. initialized values of a subset of the C coefficients together with initialized values of the D coefficients, is provided by the coefficient initializer 33 to the coefficient calculator 35 which in turn uses these initial values to begin the calculation of the subsequent coefficients of C and D.

Figure 4:
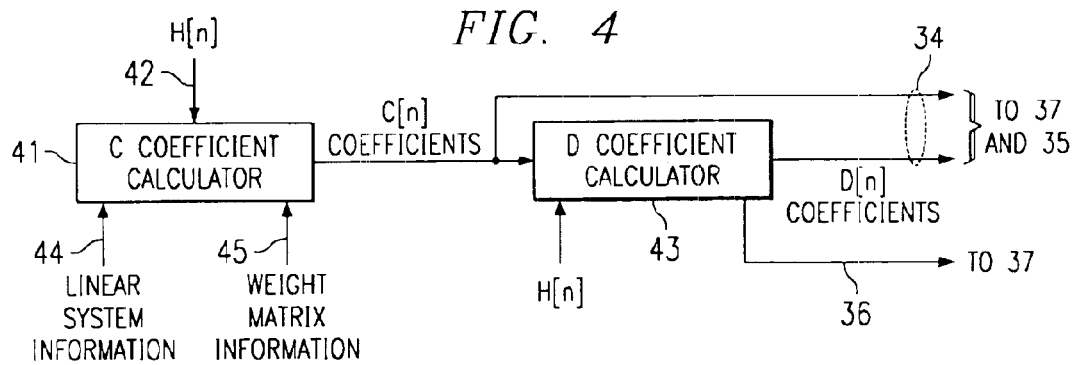
FIG. 4 diagrammatically illustrates pertinent portions of an exemplary embodiment of the coefficient initializer of FIG. 3.

FIG. 4 diagrammatically illustrates pertinent portions of an exemplary embodiment of the coefficient initializer of FIG. 3. The embodiment of FIG. 4 includes a first coefficient calculator 41 and a second coefficient calculator 43 for respectively calculating the initial subset of C coefficient values and the initial D coefficient values. The first coefficient calculator 41 calculates the initial subset of C coefficient values in response to three inputs, namely an input 42 for receiving channel estimation information, an input 44 for receiving linear system information, and an input 45 for receiving weight matrix information. In response to the aforementioned information input at 42, 44, and 45, the first coefficient calculator 41 implements a weighted least squares solution for a chosen subset of the C coefficients.

Figure 2:
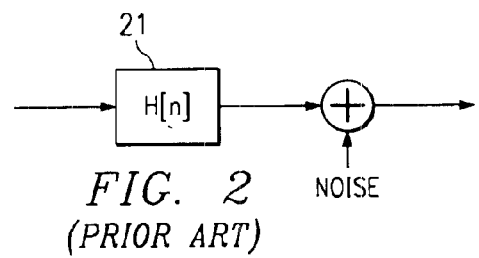
FIG. 2 diagrammatically illustrates a model of the equivalent channel of FIG. 1.

The channel estimation information is conventionally available from conventional channel estimation procedures performed on the preamble of the communication bursts. This channel estimation information corresponds to the filter tap sequence H[n] of FIG. 2. H[n] consists of a sequence of numbers, for example (3, −5, 7, 9, 2, −0.5), which numbers are the filter taps of the digital filter component of the equivalent channel. The coefficient calculator 41 chooses one of these taps as the leading tap of the sequence H[n]. Although any of the numbers in the sequence could be chosen as the leading tap, in this example the number having the largest absolute value, namely 9, is chosen as the leading tap. Once the leading tap is chosen, the remainder of the taps of H[n] are indexed as follows: uncausal taps are H[−3]=3, H[−2]=−5, and H[−1]=7; leading tap is H[0]=9; and casual taps are H[1]=2, and H[2]=−0.5. The aforementioned uncausal and causal taps have the following physical interpretations. The uncausal taps mean "physically" that injecting a unit symbol (for example numeral 1) to the system (i.e., the channel) at time t=0 will cause an output signal at earlier times, namely t=−3, t=−2 and t=−1. That is, the channel, "responds" before it is triggered. The leading tap is the channel output at time t=0, that is, at the time that the channel is actually triggered. The causal taps represent the response after the channel is triggered. An ideal channel will have only one tap in its response, namely the leading tap, and will have no other reflections. The best leading tap is the one that, when chosen together with optimal values of the C coefficients and the D coefficients, results in minimum MSE.

After the leading, causal and uncausal taps of H[n] have been determined, the C coefficient calculator 41 finds a weighted least square (WLS) solution for only a selected number (less than all) of the coefficients of C. The number N of coefficients to initialize in C can be determined, for example, based on factors such as the computational feasibility of inverting an N×N matrix, and whether or not N initialized coefficients provides the desired performance in terms of initial MSE and symbol error rate. Factors such as these and others can be evaluated, for example, in view of empirical information obtained from experimentation and simulation. In one exemplary embodiment, C[n] includes 13 coefficients, and the C coefficient calculator 41 of FIG. 4 calculates initial values for only 3 of those coefficients.

In general, the purpose of the N initialized coefficients is to minimize the uncausal 5 part of the channel and FFE common impulse response. Any causal part will be handled by the feedback filter (FBF) but any residual uncausal part will increase the MSE, causing performance degradation. Enlarging the value of N will decrease the residual uncausal part at the price of increased computational complexity.

In the embodiment of FIG. 4, the C coefficient calculator 41 finds the WLS solution for the number of coefficients chosen to be initialized, using either Equation 4 above for a T-spaced equalizer or Equation 5 above for a fractionally spaced equalizer, and using the exemplary linear system and the exemplary weight matrix described below.

The equations of the linear system in this example are:

Equation 6:

$$\sum_{k=-U}^{V} C[k] \cdot H[-k] = 1$$

Equation 7:

$$\sum_{k=-U}^{V} C[k] \cdot H[n-k] = 0, \quad n = -1, -2, -3\ldots$$

Equation 8:

$$\sum_{k=-U}^{V} C[k] \cdot H[n-k] = 0, \quad n = -2, -4\ldots$$

Equation 9:

$$\sum_{k=-U}^{V} C[k] \cdot H[n-k] = 0, \quad n = 1, 2, 3\ldots$$

Equation 10:

$$\sum_{k=-U}^{V} C[k] \cdot H[n-k] = 0, \quad n = 2, 4\ldots$$

Equation 11:

$C[k]=0, k=1, 2, 3 \ldots K$

The foregoing equations of this overdetermined linear system (i.e., having more equations than variables) basically represent the following conditions. Equation 6 reflects that the lead tap is 1 in the equivalent response of H[n] and C[n]. Equations 7 and 8 relate to uncausal ISI cancellation, and basically reflect zero uncausal ISI in the equivalent response of H[n] and C[n], Equation 7 corresponding to the T-spaced equalizer and Equation 8 corresponding to the fractionally spaced equalizer. Equations 9 and 10 relate to causal ISI cancellation, and basically reflect zero causal ISI in the equivalent response of H[n] and C[n], Equation 9 corresponding to a T-spaced equalizer and Equation 10 corresponding to a fractionally spaced equalizer. Equation 11 basically reflects minimum noise gain by C[n].

An exemplary weight matrix for use in the WLS solution will now be described. Each of Equations 6–11 actually represent one or more equations. Referencing Equation 6, there is clearly only one lead-tap equation. With reference to the uncausal ISI cancellation addressed by Equation 7 (or Equation 8), let the number of equations actually represented by Equation 7 (or 8) be designated as p. Referencing the causal ISI cancellation addressed by Equation 9 (or 10), let the number of equations actually represented be designated as q. The p and q values are generally implementation dependent and can be set as desired. In practice, the designer considers the number of taps (causal/uncausal) of the H[n] *C[n] response, where * is the convolution operator. If the number of uncausal taps in H[n] is T and the number of uncausal taps in C[n] is U, then the number of uncausal taps in H[n]*C[n] is U+T or less. Regarding the minimum noise gain addressed by Equation 11, there are K equations because, in this example, C[n] has K coefficients.

With the aforementioned definitions of p, q and K, the weight matrix is given by:

Equation 12:

$$W = \begin{pmatrix} I_{p+1} & & \\ & a \cdot I_q & \\ & & b \cdot I_k \end{pmatrix}$$

where $I_j$ denotes the unit matrix of size j×j. If the noise variance, N0/2 is given (if it is not given it can be conventionally estimated), the minimum MSE can be achieved by setting the following relationships:

Equation 13:

$$a = 0 \text{ (or } q=0)$$

Equation 14:

$$b = \frac{2 \cdot \sigma_A^2}{N0}$$

Equation 13 means that the causal ISI cancellation equations (corresponding to Equations 9 or 10) will not be used. Also note that the weight b of Equation 14 is the reciprocal of the signal-to-noise ratio (SNR).

In some embodiments, it is important to reduce the size (i.e., the absolute value) of the D coefficients, at the price of increased MSE. In such embodiments, the causal ISI cancellation equations should be used, thus requiring a non-zero value of the weight a. For example, a=1 gives causal ISI cancellation the same weight as uncausal ISI cancellation. Other examples include a=0.1 and a=0.5.

Using Equations 4–14 appropriately for either a T-spaced equalizer or a fractionally spaced equalizer, the C coefficient calculator 41 can find the WLS solution for the selected number of coefficients of C which are to be initialized. Calculation of the WLS solution for the selected number of coefficients using Equations 4–14 is a straightforward process that can be readily implemented by workers in the art, as described in detail in H. L. Van-Trees, *Detection, Estimation and Modulation Theory, Part* 1, (Wiley, 1968), and H. W. Sorenson, *Parameter Estimation*, (Marcel-Dekker, 1980), both of which are incorporated herein by reference.

The initial subset of C coefficient values produced by the C coefficient calculator 41 is provided (together with the aforementioned channel estimation information) to the D coefficient calculator 43, which calculates in response thereto the D coefficient values. The D coefficient values calculated by the D coefficient calculator 43, together with the subset of C coefficient values calculated by the C coefficient calculator 41, are input to the selector 37 of FIG. 3, which in turn provides this initial subset of the equalizer filter coefficients to the feed forward equalizer 13 (initial subset of C coefficients) and the feedback filter 17 (initial D coefficients). After the D coefficient calculator 43 calculates the initial D coefficient values and passes them through the selector 37 (along with the initial subset of C coefficient values), the control signal 36 switches the selector so that subsequent coefficients for C and D are thereafter provided from output 38 of the coefficient adaptor 35 of FIG. 3.

In response to the initial subset of coefficient values of C produced by the C coefficient calculator 41, the exemplary D coefficient calculator 43 in FIG. 4 calculates the initial D coefficient values (a total of L values) using the following exemplary equation (for a fractionally spaced equalizer).

Equation 15:

$$D[n] = -\sum_{k=-U}^{V} C[k] \cdot H[2 \cdot n - k], \quad n = 1, 2, \ldots L.$$

Figure 5:
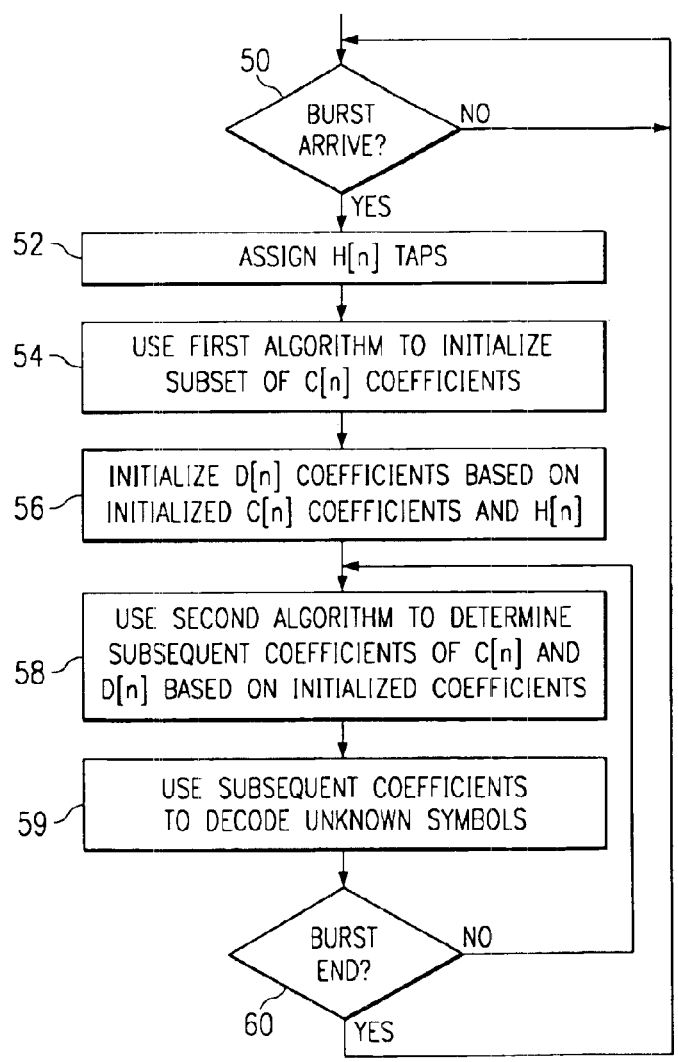
FIG. 5 diagrammatically illustrates exemplary operations which can be performed by the coefficient determiner embodiments of FIGS. 3 and 4.

FIG. 5 illustrates exemplary operations which can be performed by the embodiments of FIGS. 3 and 4. When it is determined at 50 that a communication burst has arrived, the taps of H[n] (i.e., lead, causal and uncausal) are assigned at 52. At 54, initial values of a subset of the coefficients of C[n] are calculated according to a first algorithm (e.g., LS or WLS). Thereafter at 56, the initialized coefficient values of C[n] are used along with the known H[n] information to calculate initial values of the coefficients of D[n]. Thereafter at 58, subsequent values of all the C[n] and D[n] coefficients are calculated based on the initial values, using a second algorithm (e.g., LMS). The subsequent coefficient values are then used at 59 to decode the unknown symbols. The operations at 58 and 59 are repeated for every M unknown symbols, for example, for every unknown symbol (M=1), until the end of the burst at 60.

It can be seen from the foregoing description that the present invention utilizes a first coefficient determination technique to provide an initial estimate of the values of a subset of the feed forward coefficients and, from this subset of feed forward coefficient values, calculates initial values of the feedback coefficients. This initialization of the feedback coefficients and a subset of the feed forward coefficients provides an initial slicer MSE that is low enough to permitted subsequent symbol decoding using a second coefficient calculation technique that is less computationally complex than the first coefficient calculation technique. This can advantageously reduce both latency, and the number of MMACs required for equalizer operation, while also providing an initial slicer MSE that is sufficiently low to permit decoding with a desired symbol error rate.

It will also be evident to workers in the art that the embodiments of FIGS. 3–5 can be readily implemented, for example, by suitable modification of software, hardware, or a combination of both, in the equalizer portion of a conventional digital communication receiver.

Although exemplary embodiments of the invention are described above in detail, this does not limit the scope of the invention, which can be practiced in a variety of embodiments.

What is claimed is:

1. A method of operating an equalizer which is provided in a digital communications receiver to reduce symbol decoding errors therein and which has a feed forward digital filter defined by a plurality of feed forward coefficients and a feedback digital filter defined by a plurality of feedback coefficients, comprising:

determining initial values for a subset of said feed back and feed forward coefficients without determining initial values for the remainder of said feed back and feed forward coefficients:

thereafter, in response to the initial values of the subset of said feed back and feed forward coefficients, determining subsequent values for the subset of said feed back and feed forward coefficients and also for the remainder of said feed back and feed forward coefficients; and based on the subsequent values of said feed back and feed forward coefficients, using the equalizer to decode symbols that have arrived at the receiver in a digital transmission burst.

2. The method of claim 1, wherein said step of determining initial values includes using a first coefficient determination algorithm to determine the initial values, and wherein said step of determining subsequent values includes determining the subsequent values according to a second coefficient determination algorithm that differs from said first coefficient determination algorithm.

3. The method of claim 2, wherein the first coefficient determination algorithm is more computationally complex than the second coefficient determination algorithm.

4. The method of claim 3, wherein the first coefficient determination algorithm includes one of a Least Squares algorithm and a Weighted Least Squares algorithm.

5. The method of claim 4, wherein the second coefficient determination algorithm includes a Least Mean Squares algorithm.

6. The method of claim 3, wherein the second coefficient determination algorithm includes a Least Mean Squares algorithm.

7. The method of claim 1, wherein said step of determining initial values includes determining initial values for a subset of the feed forward coefficients without determining initial values for the remainder of the feed forward coefficients.

8. The method of claim 7, wherein said step of determining initial values includes determining initial values for the feedback coefficients in response to the initial values of the subset of feed forward coefficients.

9. The method of claim 8, wherein said step of determining subsequent values includes determining the subsequent values in response to the initial values of the subset of feed forward coefficients and the initial values of the feedback coefficients.

10. An equalization apparatus for reducing symbol decoding errors in a digital communications receiver, comprising:
  a feed forward digital filter having an input for receiving digital transmission bursts, said feed forward digital filter defined by a plurality of feed forward coefficients;
  a decision element having an input coupled to said feed forward digital filter for deciding what symbols are included in the received digital transmission bursts, said decision element having an output for providing a signal indicative of the decided symbols;
  a feedback digital filter having an input coupled to said output of said decision element for filtering said signal indicative of the decided symbols, said feedback digital filter having an output for providing a filtered version of said signal, said output of said feedback digital filter coupled to said input of said decision element, said feedback digital filter defined by a plurality of feedback coefficients; and
  a coefficient determiner coupled to said feed forward filter and said feedback filter for determining initial values for a subset of said feed back and feed forward coefficients without determining initial values for the remainder of said feed back and feed forward coefficients, and for thereafter determining subsequent values for the subset of said feed back and feed forward coefficients and also for the remainder of said feed back and feed forward coefficients in response to the initial values of the subset of said feed back and feed forward coefficients, said coefficient determiner having an output coupled to said feed forward digital filter and said feedback digital filter for first outputting said initial coefficient values to said feed back and feed forward filters and for thereafter outputting said subsequent coefficient values to said feed back and feed forward filters.

11. The apparatus of claim 10 wherein said coefficient determiner includes a coefficient initializer selectively connectable to said feed forward digital filter and said feedback digital filter for using a first coefficient determination algorithm to determine said initial values for said subset of coefficients, said coefficient determiner further including a subsequent coefficient calculator for determining said subsequent coefficient values according to a second coefficient determination algorithm that differs from said first coefficient determination algorithm.

12. The apparatus of claim 11, wherein said first coefficient determination algorithm is more computationally complex than said second coefficient determination algorithm.

13. The apparatus of claim 12, wherein said first coefficient determination algorithm includes one of a Least Squares algorithm and a Weighted Least Squares algorithm.

14. The apparatus of claim 13, wherein said second coefficient determination algorithm includes a Least Mean Squares algorithm.

15. The apparatus of claim 12, wherein said second coefficient determination algorithm includes a Least Mean Squares algorithm.

16. The apparatus of claim 11, wherein said coefficient initializer includes a feed forward coefficient calculator for determining initial values for a subset of the feed forward coefficients without determining initial values for the remainder of the feed forward coefficients.

17. The apparatus of claim 16, wherein said coefficient initializer includes a feedback coefficient calculator coupled to said feed forward coefficient calculator for determining initial values for the feedback coefficients in response to the initial values of the subset of feed forward coefficients.

18. The apparatus of claim 17, wherein said subsequent coefficient calculator is responsive to the initial values of the subset of feed forward coefficients and the initial values of the feedback coefficients for determining said subsequent coefficient values.

19. The apparatus of claim 10, wherein said feedback digital filter includes a finite impulse response filter and said feed forward digital filter includes a finite impulse response filter.

20. A method of reducing symbol decoding errors in a digital communication system comprising:
  determining initial values for a subset of a plurality of feed forward and feedback coefficients without determining initial values for the remainder of said coefficients;
  in response to the initial values of the subset of said coefficients, determining subsequent values for the subset of coefficients and the remainder of the plurality of feed forward and feedback coefficients; and
  decoding symbols using the subsequent values.

21. The method of claim 20, wherein
  the feed forward coefficients define a feed forward digital filter; and
  the feedback coefficients define a feedback digital filter.

22. The method of claim 20, wherein the subset includes feed forward coefficients, feedback coefficients, or a combination of feed forward and feedback coefficients.

23. An equalization apparatus for reducing symbol decoding errors in a digital communications system, comprising:
  a feed forward digital filter defined by a plurality of feed forward coefficients;
  a feedback digital filter coupled to the feed forward digital filter and defined by a plurality of feedback coefficients; and
  a coefficient determiner coupled to said feed forward filter and said feedback filter and configured to determine initial values for a subset of the plurality of feed forward and feed back coefficients without determining initial values for the remainder of said feed back and feed forward coefficients; and in response to the initial values of the subset of said feed back and feed forward coefficient, determine subsequent values for the subset of feed back and feed forward coefficients and the remainder of the plurality of feed forward and feedback coefficients.

24. The apparatus of claim 23, further comprising:

a decision element coupled between the feed forward digital filter and the feedback digital filter, the decision element configured to decide what symbols are included in a digital transmission bursts; and generate a signal indicative of the decided symbols.

25. The apparatus of claim 23 wherein the coefficient determiner comprises:

a coefficient initializer selectively connectable to the feed forward digital filter and the feedback digital filter for using a first coefficient determination algorithm determine the initial values for the subset of feed back and feed forward coefficients; and a subsequent coefficient calculator for determining the subsequent coefficient values according to a second coefficient determination algorithm that differs from the first coefficient determination algorithm.

* * * * *